(12) United States Patent
Morita

(10) Patent No.: US 7,886,981 B2
(45) Date of Patent: Feb. 15, 2011

(54) INFORMATION PROCESSING SYSTEM, AND INFORMATION PROCESSING APPARATUS AND METHOD

(75) Inventor: Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 689 days.

(21) Appl. No.: 11/766,317

(22) Filed: Jun. 21, 2007

(65) Prior Publication Data

US 2008/0006695 A1 Jan. 10, 2008

(30) Foreign Application Priority Data

Jul. 6, 2006 (JP) ............... 2006-186540

(51) Int. Cl.
*G06K 19/06* (2006.01)
(52) U.S. Cl. .................. 235/492; 235/449; 340/870.01; 711/170
(58) Field of Classification Search .................. None
See application file for complete search history.

(56) References Cited

U.S. PATENT DOCUMENTS

| | | | |
|---|---|---|---|
| 7,427,034 B2 * | 9/2008 | Kamiyama et al. ........... | 235/492 |
| 2004/0110533 A1 * | 6/2004 | Yamagata et al. ............ | 455/558 |
| 2004/0243990 A1 * | 12/2004 | Noda et al. .................. | 717/154 |
| 2005/0114619 A1 * | 5/2005 | Matsuo et al. .............. | 711/170 |
| 2006/0050877 A1 * | 3/2006 | Nakamura .................... | 380/46 |

FOREIGN PATENT DOCUMENTS

| | | |
|---|---|---|
| EP | 1 172 754 A1 | 1/2002 |
| JP | 58-127290 | 7/1983 |
| JP | 2003-330898 | 11/2003 |
| JP | 2005-23734 | 1/2005 |
| JP | 2005-128846 | 5/2005 |
| JP | 2006-74423 | 3/2006 |
| WO | WO 03/079281 A1 | 9/2003 |

OTHER PUBLICATIONS

Office Action issued Oct. 28, 2010, in Japanese Patent Application No. 2006-186540.

* cited by examiner

*Primary Examiner*—Thien M. Le
*Assistant Examiner*—Christle I Marshall
(74) *Attorney, Agent, or Firm*—Oblon, Spivak, McClelland, Maier & Neustadt, L.L.P.

(57) ABSTRACT

An information processing system includes a magnetic-field generation apparatus for generating a magnetic field; and an information processing apparatus for performing wireless communication with an electronic device. The magnetic-field generation apparatus includes a generation section configured to generate the magnetic field, the magnetic-flux density of the magnetic field changing with time. The information processing apparatus includes an antenna for causing an induced voltage to be generated from the magnetic field and for causing an induced voltage to be generated from a magnetic field from a reader/writer; a supply section configured to supply electrical power to each section of the information processing apparatus; a verification section configured to verify whether or not the electronic device in a communicable state is an authorized device; and an output section configured to output, to another device, output information for allowing the other device connected to the information processing apparatus to operate.

16 Claims, 9 Drawing Sheets

Vcc: Supply voltage

RST: Reset input

CLK: Clock input

GND: Ground

I/O: Serial communication input/output

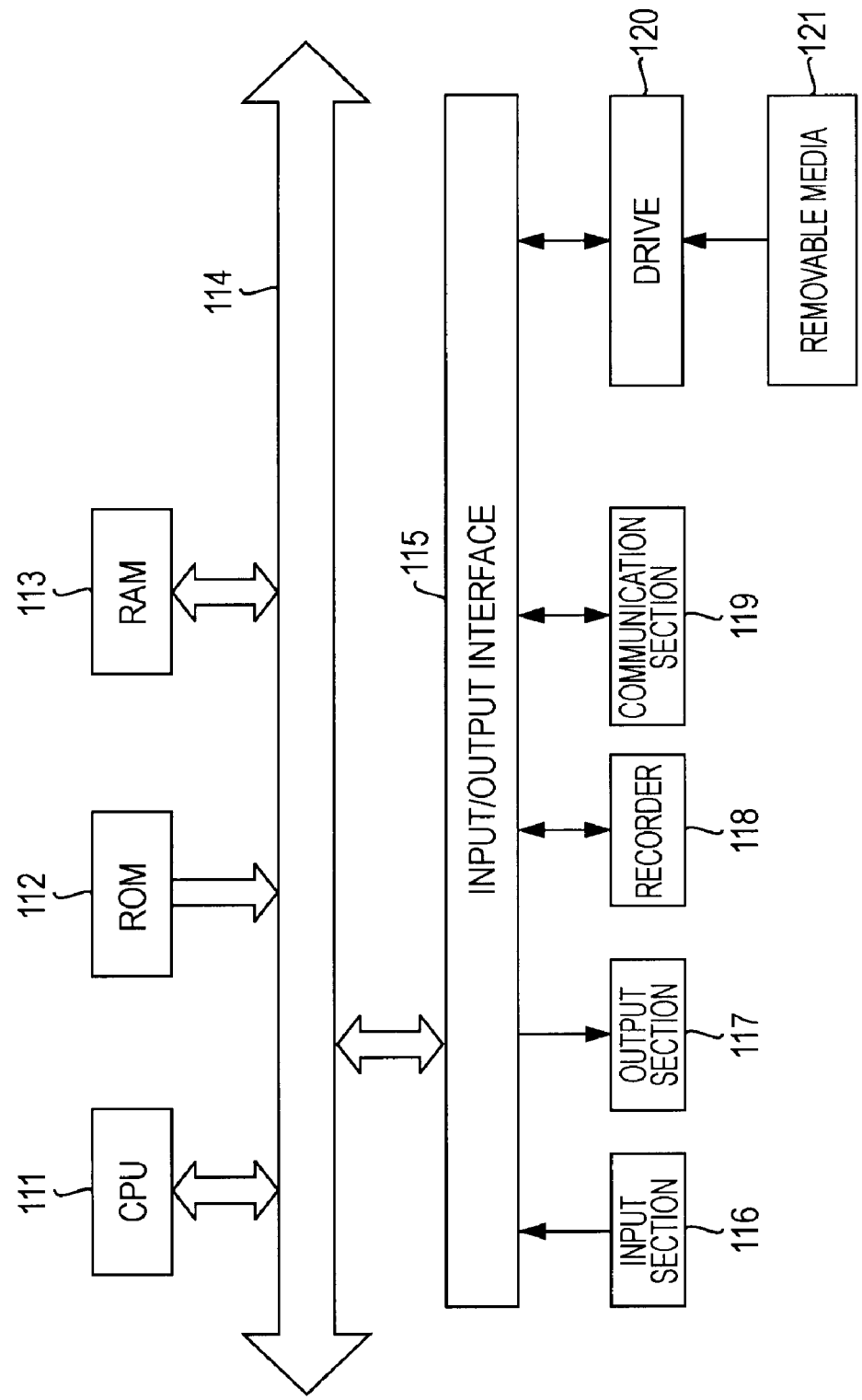

INFORMATION PROCESSING SYSTEM, AND INFORMATION PROCESSING APPARATUS AND METHOD

CROSS REFERENCES TO RELATED APPLICATIONS

The present invention contains subject matter related to Japanese Patent Application JP 2006-186540 filed in the Japanese Patent Office on Jul. 6, 2006, the entire contents of which are incorporated herein by reference.

BACKGROUND OF THE INVENTION

1. Field of the Invention

The present invention relates to an information processing system, and an information processing apparatus and method. More particularly, the present invention relates to an information processing system that is driven by electrical power obtained from a magnetic field and to an information processing apparatus and method.

2. Description of the Related Art

In recent years, non-contact-type ICs (Integrated Circuits) have become popular. When compared with magnetic cards, IC cards are capable of recording a large amount of data and data can be encrypted therefor, and are therefore superior in terms of security. For example, IC cards are used as cards for the logging of people entering/leaving a room, cards for storing electronic money, commuter passes of transportation facilities, credit cards of financial institutions, and the like. IC cards are classified into a contact-type and a non-contact type depending on the communication method used. Non-contact IC cards have incorporated therein an antenna in which antenna wire is wound by a predetermined number of windings, and perform communication with a terminal, such as a dedicated reader/writer, by using very weak radio waves.

Some non-contact IC cards have not only an IC card function for communicating with a dedicated reader/writer, but also a reader/writer function for communicating with another non-contact IC card. As a result, non-contact IC cards operate as IC cards through the IC card function and also operate as reader/writers through the reader/writer function.

Hereinafter, a non-contact IC card having both an IC card function and a reader/writer function will be referred to as an IC card reader/writer. A mode in which an IC card reader/writer operates as an IC card will be referred to as a card mode, and a mode in which an IC card reader/writer operates as a reader/writer will be referred to as a reader/writer mode.

In addition, a non-contact-type card lock has been proposed such that, when an RF (radio frequency) circuit for detecting a card identifies the existence of a non-contact IC card through the intermittent output of an electromagnetic wave, supply of driving power from a battery to the RF circuit for detecting a card is stopped, and driving power is supplied from a battery to an RF circuit for data communication, a card lock control circuit, and an electrical lock (refer to, for example, Japanese Unexamined Patent Application Publication No. 2005-23734).

SUMMARY OF THE INVENTION

However, IC card reader/writers of the related art have incorporated therein, an output circuit for supplying electrical power to a non-contact IC card and an oscillator for generating a clock in order to implement part of the reader/writer function. However, there is a problem in that these circuits become enlarged because they handle a large amount of electrical power. Furthermore, in an IC card reader/writer of the related art, a crystal is used in an incorporated oscillator. Since the price of such crystals is high, the price of the IC card reader/writer is also high.

For example, in a personal computer having a function of log-in authentication using a non-contact IC card, it is necessary for an IC card reader/writer provided therein to constantly generate a magnetic field and perform polling in order to detect a non-contact IC card presented by a user. However, in a notebook-type personal computer that is battery-driven, it is difficult to use functions for which the amount of battery consumption is large because of limitations due to battery driving.

Furthermore, in an IC card reader/writer of the related art, for example, when an IC card reader/writer is configured to have both a reader/writer function and an IC card function by means of a magnetic-field generation circuit, if a high voltage is applied from the outside while the magnetic-field generation circuit is not in operation, a so-called latch-up phenomenon occurs, and maloperation and heat generation can occur.

When information is to be moved by using a non-contact IC card, an IC card reader/writer acting as the source where information has been stored is operated, and after the non-contact IC card is moved close to the IC card reader/writer, the non-contact IC card is moved close to an IC card reader/writer acting as the target. The operation for the IC card reader/writer acting as the source is complex and necessitates time and effort.

In Japanese Unexamined Patent Application Publication No. 2005-23734 described above, a non-contact card key in which a non-contact IC card is used as a key of a door of a room is proposed. When the key is to be replaced, an operation of changing a key inside the IC card reader/writer by using a dedicated device without replacing an expensive IC card reader/writer is performed. Therefore, there is a problem in that the management of the dedicated device is troublesome and the operation is complex.

The present invention has been made in view of such circumstances. It is desirable to provide a more miniaturized IC card reader/writer at a low cost.

According to an embodiment of the present invention, there is provided an information processing system including: a magnetic-field generation apparatus for generating a magnetic field; and an information processing apparatus for performing wireless communication with an electronic device, the information processing apparatus having a reader/writer function and an IC card function, wherein the magnetic-field generation apparatus includes generation means for generating the magnetic field, the magnetic-flux density of the magnetic field changing with time, and wherein the information processing apparatus includes an antenna for causing an induced voltage to be generated from the magnetic field when the reader/writer function is to be operated and for causing an induced voltage to be generated from a magnetic field from a reader/writer when the IC card function is to be operated; supply means for supplying electrical power obtained by rectifying the generated induced voltage to each section of the information processing apparatus; verification means for verifying whether or not the electronic device in a communicable state is an authorized device on the basis of the magnetic field generated by the magnetic-field generation apparatus when the reader/writer function is to be operated; and output means for outputting, to another device, output information for allowing the other device connected to the information processing apparatus to operate, the output information being obtained from transmission information transmitted from the electronic device, when the electronic device is authenticated to be an authorized device.

In an embodiment of the present invention, in the magnetic-field generation apparatus, a magnetic field whose magnetic-flux density changes with time is generated. In the information processing apparatus, when a reader/writer function is to be operated, an induced voltage is generated from a magnetic field, and when an IC card function is to be operated, an induced voltage is generated from a magnetic field from a reader/writer. Electrical power obtained by rectifying the generated induced voltage is supplied to each section of the information processing apparatus. When a reader/writer function is to be operated, it is verified whether or not an electronic device in a communicable state is an authorized device on the basis of the magnetic field generated by the magnetic-field generation apparatus. When the electronic device is authenticated to be an authorized device, output information for allowing another device connected to the information processing apparatus to operate, the output information being transmitted from the electronic device, is output to the other device.

According to another embodiment of the present invention, there is provided an information processing apparatus for performing wireless communication with an electronic device, the information processing apparatus having a reader/writer function and an IC card function, the information processing apparatus including: an antenna for causing an induced voltage to be generated from a magnetic field generated by a magnetic-field generation apparatus, the magnetic flux of the magnetic field changing with time, when the reader/writer function is to be operated and for causing an induced voltage to be generated from a magnetic field from a reader/writer when the IC card function is to be operated; supply means for supplying electrical power obtained by rectifying the generated induced voltage to each section of the information processing apparatus; verification means for verifying whether or not the electronic device in a communicable state is an authorized device on the basis of the magnetic field generated by the magnetic-field generation apparatus when the reader/writer function is to be operated; and output means for outputting, to another device, output information for allowing the other device connected to the information processing apparatus to operate, the output information being obtained from transmission information transmitted from the electronic device, when the electronic device is authenticated to be an authorized device.

The information processing apparatus may further include control means for controlling an operation mode so that, when the IC card function is operated, the reader/writer function is operated when the time period during which the IC card function is operated has passed a predetermined time period.

The information processing apparatus may further include extraction means for extracting, from the magnetic field, a clock used for the operation of each section of the information processing apparatus.

The output means may output the output information to the other device when the transmission information matches information regarding a service provided by the other device, the information being stored in the information processing apparatus.

According to another embodiment of the present invention, there is provided an information processing method for use with an information processing apparatus for performing wireless communication with an electronic device, the information processing apparatus having a reader/writer function and an IC card function, the information processing method including the steps of: causing an antenna to supply electrical power to each section of the information processing apparatus, the electrical power being obtained by rectifying an induced voltage generated from a magnetic field generated by a magnetic-field generation apparatus, the magnetic-flux density of the magnetic field changing with time, when the reader/writer function is to be operated or being obtained by rectifying an induced voltage generated from a magnetic field from a reader/writer when the IC card function is to be operated; verifying whether or not the electronic device in a communicable state is an authorized device by using the magnetic field generated by the magnetic-field generation apparatus when the reader/writer function is to be operated; and outputting, to another device, output information for allowing the other device connected to the information processing apparatus to operate, the output information being obtained from transmission information transmitted from the electronic device, when the electronic device is authenticated to be an authorized device.

In another embodiment of the present invention, an antenna causes electrical power to be supplied to each section of the information processing apparatus, the electrical power being obtained by rectifying an induced voltage generated from a magnetic field generated by the magnetic-field generation apparatus, the magnetic-flux density of the magnetic field changing with time, when a reader/writer function is to be operated, or being obtained by rectifying an induced voltage generated from a magnetic field from a reader/writer when an IC card function is to be operated. When the reader/writer function is to be operated, it is verified whether or not an electronic device in a communicable state is an authorized device. When the electronic device is authenticated to be an authorized device, output information for allowing another device connected to the information processing apparatus to operate, the output information being obtained from transmission information transmitted from the electronic device, is output to the other device.

As described in the foregoing, according to an embodiment of the present invention, driving is possible by electrical power obtained from a magnetic field. In particular, it is possible to provide a more miniaturized IC card reader/writer at a low cost.

According to another embodiment of the present invention, driving is possible by electrical power obtained from a magnetic field from the outside. In particular, it is possible to provide a more miniaturized IC card reader/writer at a low cost.

BRIEF DESCRIPTION OF THE DRAWINGS

FIG. 9 is a block diagram showing the configuration of a personal computer.

DESCRIPTION OF THE PREFERRED EMBODIMENTS

Figure 1:
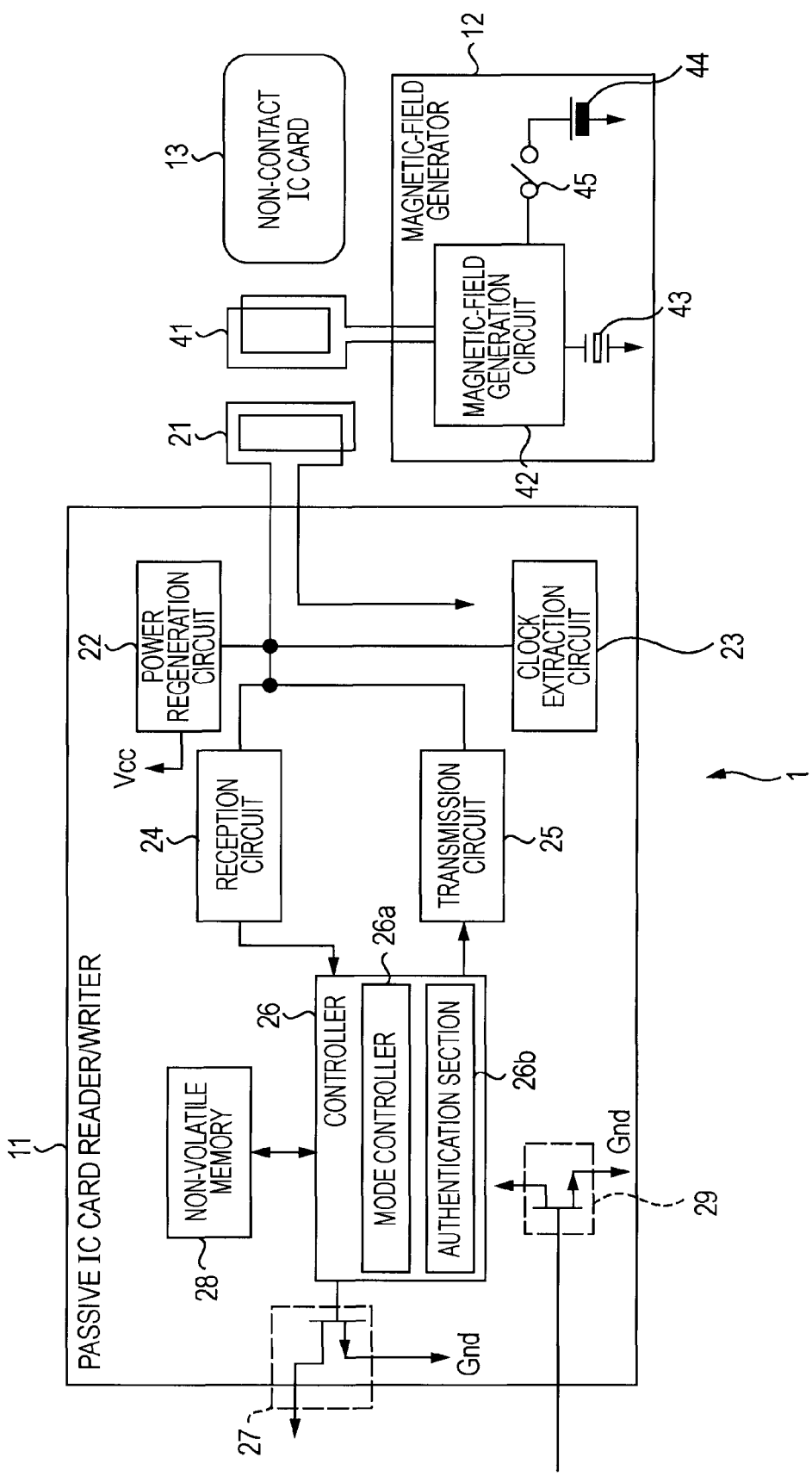
FIG. 1 is a block diagram showing the configuration of an embodiment of an IC card system to which the present invention is applied.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims. Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

An information processing system (for example, an IC card system 1 of FIG. 1) according to an embodiment of the present invention includes: a magnetic-field generation apparatus (for example, a magnetic-field generator 12 of FIG. 1) for generating a magnetic field; and an information processing apparatus (for example, a passive IC card reader/writer 11 of FIG. 1) for performing wireless communication with an electronic device (for example, a non-contact IC card 13 of FIG. 1), the information processing apparatus having a reader/writer function and an IC card function, wherein the magnetic-field generation apparatus includes generation means (for example, a magnetic-field generation circuit 42 of FIG. 1) for generating the magnetic field, the magnetic-flux density of the magnetic field changing with time, and wherein the information processing apparatus includes an antenna (for example, an antenna 21 of FIG. 1) for causing an induced voltage to be generated from the magnetic field when the reader/writer function is to be operated and for causing an induced voltage to be generated from a magnetic field from a reader/writer when the IC card function is to be operated; supply means (for example, an electrical power regeneration circuit 22 of FIG. 1) for supplying electrical power obtained by rectifying the generated induced voltage to each section of the information processing apparatus; verification means (for example, a verification section 26b of FIG. 1) for verifying whether or not the electronic device in a communicable state is an authorized device on the basis of the magnetic field generated by the magnetic-field generation apparatus when the reader/writer function is to be operated; and output means (for example, an output circuit 27 of FIG. 1) for outputting, to another device, output information for allowing the other device connected to the information processing apparatus to operate, the output information being obtained from transmission information transmitted from the electronic device, when the electronic device is authenticated to be an authorized device.

An information processing apparatus according to another embodiment of the present invention is an information processing apparatus (for example, a passive IC card reader/writer 11 of FIG. 1) for performing wireless communication with an electronic device (for example, a non-contact IC card 13 of FIG. 1), the information processing apparatus having a reader/writer function and an IC card function, the information processing apparatus including: an antenna (for example, an antenna 21 of FIG. 1) for causing an induced voltage to be generated from a magnetic field generated by a magnetic-field generation apparatus (for example, a magnetic-field generator 12 of FIG. 1), the magnetic flux of the magnetic field changing with time, when the reader/writer function is to be operated and for causing an induced voltage to be generated from a magnetic field from a reader/writer when the IC card function is to be operated; supply means (for example, an electrical power regeneration circuit 22 of FIG. 1) for supplying electrical power obtained by rectifying the generated induced voltage to each section of the information processing apparatus; verification means (for example, a verification section 26b of FIG. 1) for verifying whether or not the electronic device in a communicable state is an authorized device on the basis of the magnetic field generated by the magnetic-field generation apparatus when the reader/writer function is to be operated; and output means (for example, an output circuit 27 of FIG. 1) for outputting, to another device, output information for allowing the other device connected to the information processing apparatus to operate, the output information being obtained from transmission information transmitted from the electronic device, when the electronic device is authenticated to be an authorized device.

The information processing apparatus may further include control means (for example, a mode controller 26a of FIG. 1) for controlling an operation mode so that, when the IC card function is operated, the reader/writer function is operated when the time period during which the IC card function is operated has passed a predetermined time period.

The information processing apparatus may further include extraction means (for example, a clock extraction section 23 of FIG. 1) for extracting, from the magnetic field, a clock used for the operation of each section of the information processing apparatus.

The output means may output (for example, the process of step S35 of FIG. 6) the output information to the other device when the transmission information matches information regarding a service provided by the other device, the information being stored in the information processing apparatus.

According to another embodiment of the present invention, there is provided an information processing method for use with an information processing apparatus for performing wireless communication with an electronic device, the information processing apparatus having a reader/writer function and an IC card function, the information processing method including the steps of: causing (for example, the process of step S21 FIG. 5) an antenna to supply electrical power to each section of the information processing apparatus, the electrical power being obtained by rectifying an induced voltage generated from a magnetic field generated by a magnetic-field generation apparatus, the magnetic-flux density of the magnetic field changing with time, when the reader/writer function is to be operated or being obtained by rectifying an induced voltage generated from a magnetic field from a reader/writer when the IC card function is to be operated; verifying (for example, the process of step S33 FIG. 6) whether or not the electronic device in a communicable state is an authorized device by using the magnetic field generated by the magnetic-field generation apparatus when the reader/writer function is to be operated; and outputting (for example, the process of step S35 FIG. 6), to another device, output information for allowing the other device connected to the information processing apparatus to operate, the output information being obtained from transmission information transmitted from the electronic device, when the electronic device is authenticated to be an authorized device.

Embodiments of the present invention will now be described below with reference to the drawings.

FIG. 1 is a block diagram showing the configuration of an embodiment of an IC card system to which the present invention is applied. An IC card system 1 is configured to include a passive IC card reader/writer 11, a magnetic-field generator 12, and a non-contact IC card 13.

When the passive IC card reader/writer 11 operates in a card mode, the passive IC card reader/writer 11 performs predetermined processing for the purpose of performing wireless communication with a reader/writer (not shown). When the passive IC card reader/writer 11 operates in a reader/writer mode, the passive IC card reader/writer 11 performs predetermined processing for the purpose of performing wireless communication with a non-contact IC card 13.

The passive IC card reader/writer 11 is configured to include an antenna 21, an electrical power regeneration circuit 22, a clock extraction circuit 23, a reception circuit 24, a transmission circuit 25, a controller 26, an output circuit 27, a non-volatile memory 28, and an input circuit 29.

The antenna 21 is composed of, for example, a conductor, such as copper or aluminum, and is formed as a so-called loop antenna having a predetermined number of windings (pattern) of two or more windings. The antenna 21 uses an electromagnetic field induced by the magnetic-field generator 12 as a medium for transmitting information (data) (for example, by an electromagnetic induction method) in order to perform communication in a wireless manner with, for example, the non-contact IC card 13.

The antenna 21 is adjusted so as to resonate with the frequency of a magnetic field generated by an antenna 41 of the magnetic-field generator 12 (to be described later). A portion of the magnetic field generated by the antenna 41 crosses the antenna 21, thereby inducing an AC voltage in the antenna 21 (hereinafter referred to as a "received voltage").

The electrical power regeneration circuit 22 is constituted by, for example, a rectification circuit that is typically used for an IC card. The electrical power regeneration circuit 22 converts an AC received voltage from the antenna 21 into a DC power-supply voltage $V_{CC}$, and supplies the power-supply voltage $V_{CC}$ to each section of the passive IC card reader/writer 11. As a result, electrical power is supplied to each section of the passive IC card reader/writer 11, and the passive IC card reader/writer 11 is driven.

The clock extraction circuit 23 generates a clock signal used for each section of the passive IC card reader/writer 11 from the received signal received by the antenna 21. The clock extraction circuit 23 supplies the generated clock signal to each section, such as the controller 26, of the passive IC card reader/writer 11. For example, the clock extraction circuit 23 has incorporated therein a PLL (Phase Locked Loop) circuit, and generates a clock signal of the same frequency as the received signal. As a result, the passive IC card reader/writer 11 operates on the basis of the generated clock signal.

When the reception circuit 24 is to receive data in an operation mode of one of the card mode and the reader/writer mode, the reception circuit 24 performs, for example, a predetermined demodulation process on a modulated wave received by the antenna 21, thereby demodulating the modulated wave. The reception circuit 24 supplies the received data obtained by demodulating the modulated wave to the controller 26.

The controller 26 controls each section of the passive IC card reader/writer 11.

On the basis of the received data supplied from the reception circuit 24, the controller 26 performs a predetermined process. The controller 26 supplies the data obtained by performing the predetermined process to the output circuit 27. Then, the output circuit 27 outputs the data supplied from the controller 26 to another device (not shown) connected to the passive IC card reader/writer 11.

The input circuit 29 supplies, to the controller 26, the data supplied from the other device (not shown) connected to the passive IC card reader/writer 11.

The controller 26 performs a predetermined process for the purpose of transmitting the data supplied from the input circuit 29 to the non-contact IC card 13. The controller 26 supplies the transmission data obtained by performing the predetermined process to the transmission circuit 25.

When the transmission circuit 25 is to transmit data in an operation mode of one of the card mode and the reader/writer mode, the transmission circuit 25 performs a predetermined modulation process on the transmission data supplied from the controller 26, thereby modulating the transmission data. The transmission circuit 25 supplies the modulated wave obtained by modulating the transmission data to the antenna 21.

The non-volatile memory 28 is constituted by, for example, an EEPROM (Electronically Erasable and Programmable Read Only Memory), a flash memory, or the like. Under the control of the controller 26, the non-volatile memory 28 stores data supplied from the controller 26, or reads data and supplies it to the controller 26.

The controller 26 is configured to include a mode controller 26a and an authentication section 26b.

The mode controller 26a controls the operation mode of the passive IC card reader/writer 11. More specifically, the mode controller 26a shifts the operation mode of the passive IC card reader/writer 11 to, for example, a card mode or a reader/writer mode.

The authentication section 26b performs a mutual authentication process to be performed between the passive IC card reader/writer 11 and the non-contact IC card 13. More specifically, the authentication section 26b performs, with the non-contact IC card 13, mutual authentication for which the passive IC card reader/writer 11 accesses information stored in the non-contact IC card 13.

The magnetic-field generator 12 generates a magnetic field whose magnetic-flux density changes with respect to time. The magnetic-field generator 12 is configured to include an antenna 41, a magnetic-field generation circuit 42, a crystal oscillator 43, a power supply 44, and a switch 45.

The antenna 41, similarly to the antenna 21, is formed as a so-called loop antenna constituted by, for example, a conductor such as copper. The antenna 41 is adjusted to a size and a resonance frequency at which magnetic-field generation efficiency is improved.

The magnetic-field generation circuit 42 is driven by electrical power from the power supply 44, and drives the antenna 41 in order to generate a magnetic field so as to match the frequency of oscillation by the crystal oscillator 43. The magnetic-field generation circuit 42 has an electrical power limitation function for ensuring that a predetermined fixed electrical power is supplied even if the exterior environment is changed.

The crystal oscillator 43 is a crystal that is sliced thinly and oscillates in response to an electrical current when a voltage is applied. The thinner the slice, the more pronounced the oscillation becomes, and it is possible for the magnetic-field generation circuit 42 to generate a magnetic field having a high frequency.

The switch 45 is provided between the magnetic-field generation circuit 42 and the power supply 44. The state of the switch 45 is changed, for example, in response to an operation by the user. That is, when the switch 45 is turned on, since electrical power is supplied to the magnetic-field generation circuit 42, a magnetic field is generated in the antenna 41. When the switch 45 is turned off, since electrical power is not supplied to the magnetic-field generation circuit 42, a magnetic field is not generated.

The non-contact IC card 13 has incorporated therein, for example, a non-contact IC chip, an antenna, and the like, and performs near-field communication with the passive IC card reader/writer 11 having a reader/writer function.

More specifically, as a result of the user moving the non-contact IC card 13 close to the passive IC card reader/writer 11, in the non-contact IC card 13, a magnetic field (electromagnetic wave) radiated from the antenna 41 of the magnetic-field generator 12 serves to supply electrical power, the internal circuit of the non-contact IC card 13 is started up, and a communication channel between the passive IC card reader/writer 11 and the non-contact IC card 13 is opened. As a result, it becomes possible for the passive IC card reader/writer 11 to read and write data from and into the non-contact IC card 13.

When the passive IC card reader/writer 11 operates in the reader/writer mode, the passive IC card reader/writer 11 transmits a signal for detecting the non-contact IC card 13. At this time, for example, by changing the power consumption of the magnetic field received from the magnetic-field generator 12 in order to perform amplitude modulation of the magnetic field from the magnetic-field generator 12 in an equivalent manner, the passive IC card reader/writer 11 performs communication with the non-contact IC card 13.

The IC card system 1 can be applied to various modes and can be used as, for example, a key of a door installed in the entrance of a room. Accordingly, in this embodiment, a description will be given by using as an example in which the IC card system 1 is used as a key of a door.

Figure 2:
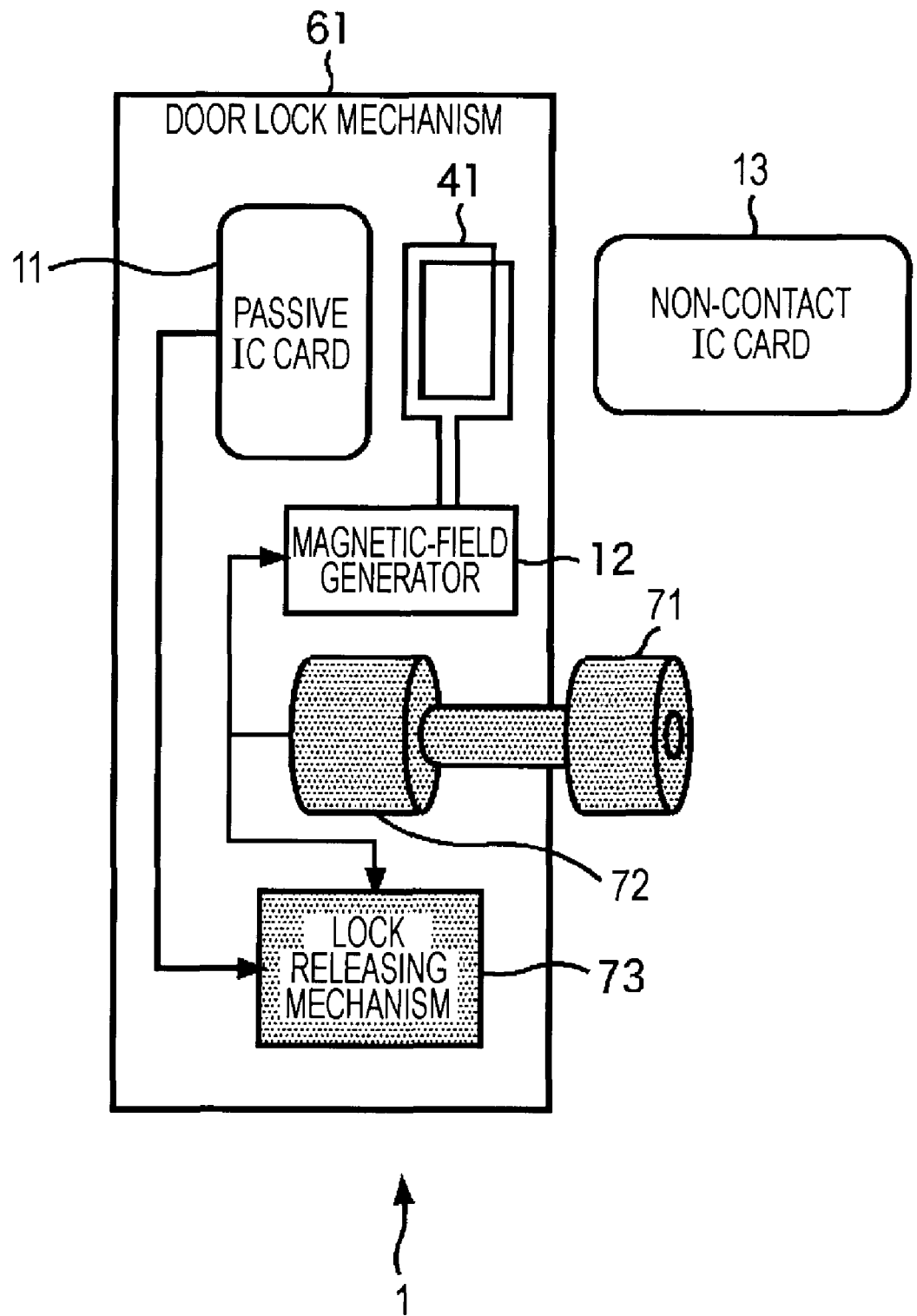
FIG. 2 is a block diagram of an IC card system used as a key of a door.

FIG. 2 is a block diagram of the IC card system 1 used as a key of a door.

Components in FIG. 2, which correspond to those in FIG. 1, are designated with the same reference numerals, and descriptions of components for which the same processing is performed are omitted to avoid duplicate description.

The IC card system 1 of FIG. 2 includes the non-contact IC card 13 and a door lock mechanism 61.

The door lock mechanism 61 is provided as, for example, a key of a door installed in an entry/exit of a room. When the user presents the non-contact IC card 13, the door lock mechanism 61 verifies whether or not the non-contact IC card 13 is an authorized non-contact IC card. When it is verified that the non-contact IC card 13 is an authorized non-contact IC card, the door lock mechanism 61 releases the lock of the door so that the door can be opened by the user who presented the non-contact IC card 13.

The door lock mechanism 61 is configured to include the passive IC card reader/writer 11, the magnetic-field generator 12, a door knob 71, a power generator 72, and a lock releasing mechanism 73. In the door lock mechanism 61, the door knob 71, the power generator 72, and the lock releasing mechanism 73, which are blocks that are provided when the IC card system 1 is used as a key of a door, are represented by hatching.

The power generator 72 generates power when the door knob 71 is rotated by the user, and supplies the power obtained by the power generation to the magnetic-field generator 12 or the lock releasing mechanism 73. Then, in the magnetic-field generator 12, the magnetic-field generation circuit 42 is driven by electrical power from the power generator 72, and drives the antenna 41 in order to generate a magnetic field so as to match the frequency of the oscillation generated by the crystal oscillator 43. That is, the power generator 72 generates electrical power in response to the rotation of the door knob 71 and supplies the electrical power to the magnetic-field generation circuit 42 instead of power being supplied by the power supply 44 of FIG. 1.

As described above, the magnetic field (electromagnetic wave) generated by the magnetic-field generator 12 causes electrical power to be supplied to each section of the passive IC card reader/writer 11, and the passive IC card reader/writer 11 is driven. As a result, when the operation mode of the passive IC card reader/writer 11 is a card mode, the passive IC card reader/writer 11 operates as an IC card, and when the operation mode thereof is a reader/writer mode, the passive IC card reader/writer 11 operates as a reader/writer.

At this point, when the passive IC card reader/writer 11 is operating in the reader/writer mode, in the case that the user moves the non-contact IC card 13 close to (the door lock mechanism 61 provided in) the door, the magnetic field generated by the magnetic-field generator 12 causes electrical power to be supplied to the non-contact IC card 13, and the non-contact IC card 13 is driven. As a result, since communication can be performed between the passive IC card reader/writer 11 and the non-contact IC card 13, it is possible for the passive IC card reader/writer 11 to read and write information from and into the non-contact IC card 13.

Then, the passive IC card reader/writer 11 verifies whether or not the non-contact IC card 13 presented by the user is an authorized non-contact IC card. When it is verified that the non-contact IC card 13 is an authorized non-contact IC card, the passive IC card reader/writer 11 outputs a notification for releasing the lock of the door to the lock releasing mechanism 73. More specifically, for example, in the passive IC card reader/writer 11, when it is verified that the non-contact IC card 13 is an authorized non-contact IC card, the controller 26 short-circuits the output terminal of the output circuit 27, thereby notifying the lock releasing mechanism 73 of the fact that the lock of the door is to be released.

The lock releasing mechanism 73 is driven by electrical power from the power generator 72, and opens/closes the key of the door in which the door lock mechanism 61 is provided on the basis of the notification supplied from the passive IC card reader/writer 11.

More specifically, when the user moves the authorized non-contact IC card 13 close to (the door lock mechanism 61 provided in) the door, a notification for releasing the lock is supplied to the lock releasing mechanism 73 from the passive IC card reader/writer 11. In response to the notification, the lock releasing mechanism 73 releases the lock of the door in which the door lock mechanism 61 is provided. As a result, it is possible for the user having the authorized non-contact IC card 13 to open the door and enter the room.

For example, in the door lock mechanism 61, the replacement of the passive IC card reader/writer 11 can be made easier by forming the passive IC card reader/writer 11 in a card shape so as to be capable of being inserted into the back side of the door. Furthermore, at this time, since only the passive IC card reader/writer 11 is replaced, the same magnetic-field generator 12 can be used without being changed. As a result, since the crystal oscillator 43 in which an expensive crystal is used can be used as it is, it is possible to replace the passive IC card reader/writer 11 at a lower cost.

When the door lock mechanism 61 is constituted by, for example, the power generator 72 for generating electrical power as a result of the door knob 71 being rotated, the magnetic-field generator 12 for generating a magnetic field on the basis of the electrical power from the power generator 72, the passive IC card reader/writer 11, and the non-contact IC card 13, the passive IC card reader/writer 11 and the non-contact IC card 13 being driven by the magnetic field by the magnetic-field generator 12, and when the lock releasing mechanism 73 connected to the passive IC card reader/writer 11 is constituted by an electromagnet, the door lock mechanism 61 can be configured so as not to use a power source such as a battery. As a result, it is possible to reduce a burden of maintenance by the user.

Figure 3:
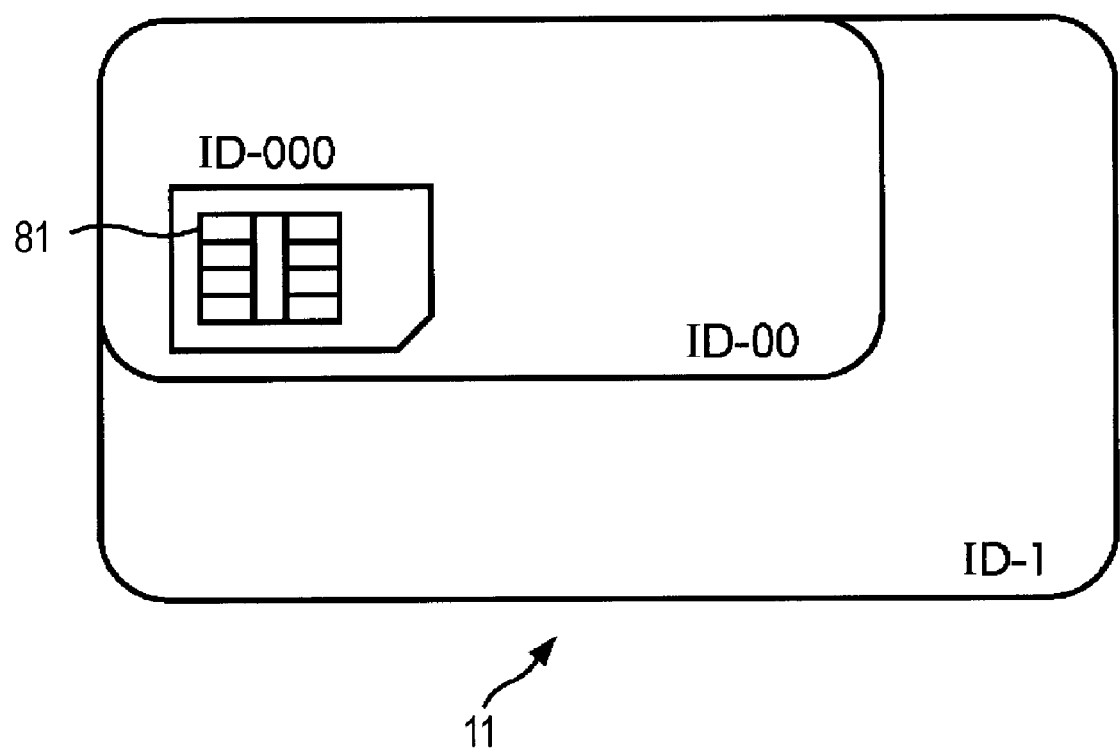
FIG. 3 shows an example of the shape of a passive IC card reader/writer.

The passive IC card reader/writer 11 is a card made of, for example, material such as vinyl chloride or plastic, and is typically formed into a size of 85.72 (mm)×54.03 (mm)×0.76 (mm) ±error, which complies with the ID-1 standard (ISO (International Organization for Standardization)/IEC (International Electrotechnical Commission) 7810) similarly to a magnetic stripe card and a contact-type IC card, as shown in FIG. 3.

The size of the passive IC card reader/writer 11 is not limited to a size in compliance with the ID-1 standard, and may be a size in compliance with standards such as, for example, ID-00 and ID-000, as shown in FIG. 3, which is a size smaller than the size in compliance with the ID-1 standard. Furthermore, the shape of the passive IC card reader/writer 11 is not limited to a card shape shown in FIG. 3 and may be another shape such as, for example, a circle or a polygon. The passive IC card reader/writer 11 may be incorporated in a device such as, for example, a cellular phone.

As shown in FIG. 3, the passive IC card reader/writer 11 is provided with an external input/output terminal 81. The passive IC card reader/writer 11 is connected to another device such as, for example, the lock releasing mechanism 73, via the external input/output terminal 81.

Figure 4:
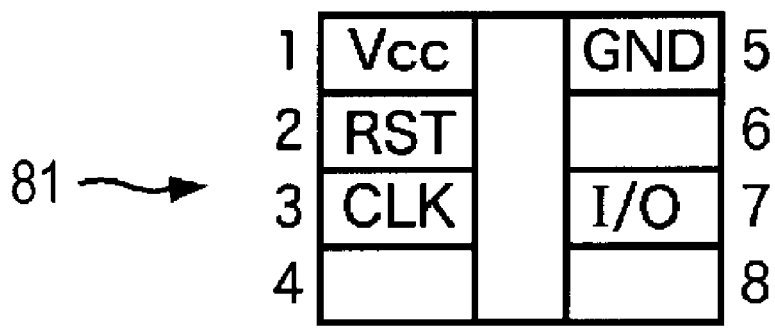
FIG. 4 shows an example of an external input/output terminal.

More specifically, as shown in FIG. 4, the external input/output terminal 81 is constituted by eight terminals 1 to 8. In the external input/output terminal 81, the terminal 1 ($V_{CC}$: Supply voltage) is a terminal for a circuit voltage, the terminal 2 (RST: Reset input) is a terminal for a reset signal, the terminal 3 (CLK: Clock input) is a terminal for a clock signal, and the terminal 4 is an unused terminal for expansion. In the external input/output terminal 81, the terminal 5 (GND: Ground) is a terminal for ground, the terminal 6 is an unused terminal for expansion, the terminal 7 (I/O (Serial communication input/output)) is a terminal for data input/output, and the terminal 8 is an unused terminal for expansion.

In FIG. 4, in the passive IC card reader/writer 11, for example, the terminal 4 among the terminals 4, 6, and 8, which are unused terminals, is made to be an input terminal of the input circuit 29 and the terminal 8 is made to be an output terminal of the output circuit 27, with the result that the passive IC card reader/writer 11 is connected to another device such as, for example, the lock releasing mechanism 73 via those terminals.

Next, a description will be given, with reference to the flowcharts in FIGS. 5 and 6, of a data transmission/reception process performed by the passive IC card reader/writer 11, the magnetic-field generator 12, and the non-contact IC card 13 constituting the IC card system 1.

In step S11, the magnetic-field generator 12 turns on the power supply at a predetermined timing. More specifically, for example, in the door lock mechanism 61 provided in a door, when the door knob 71 is rotated by the user, electrical power generated by the power generator 72 is supplied to the magnetic-field generation circuit 42 of the magnetic-field generator 12. Then, the magnetic-field generation circuit 42 drives the antenna 41 in order to generate a magnetic field so as to match the frequency of the oscillation by the crystal oscillator 43. As a result, the magnetic-field generator 12 generates a magnetic field of a predetermined frequency.

In the following, processing of steps S21 to S35 by the passive IC card reader/writer 11 and processing of steps S51 to S55 by the non-contact IC card 13 are, for example, processing when the magnetic-field generator 12 generates a magnetic field of a predetermined frequency.

In step S21, the electrical power regeneration circuit 22 converts an AC received voltage, induced as a result of some of the magnetic field generated by the antenna 41 provided in the magnetic-field generator 12 being crossed, into a DC power-supply voltage $V_{CC}$, and supplies the power-supply voltage $V_{CC}$ to each section of the passive IC card reader/writer 11, thereby turning on the power supply of the passive IC card reader/writer 11. As a result, for example, in the door lock mechanism 61 provided in a door, the magnetic field radiated from the antenna 41 of the magnetic-field generator 12 causes electrical power to be supplied to the passive IC card reader/writer 11, and the passive IC card reader/writer 11 is driven.

In step S22, the mode controller 26a shifts the operation mode of the passive IC card reader/writer 11 to a card mode. At this time, since the passive IC card reader/writer 11 is in a card mode, it operates as an IC card.

In step S23, the controller 26 monitors the status of the reception circuit 24 in order to determine whether or not the antenna 21 has received a card detection signal from a reader/writer (not shown).

At this point, the card detection signal refers to a signal for detecting a non-contact IC card in a communicable state, which is transmitted from a reader/writer (another passive IC card reader/writer) to a non-contact IC card. When the reader/writer transmits the card detection signal, since a response (hereinafter referred to as a "card detection response") is returned from the non-contact IC card in a communicable state (the passive IC card reader/writer 11), the reader/writer detects the non-contact IC card in a communicable state by receiving the card detection response.

When it is determined in step S23 that the antenna 21 has received the card detection signal from the reader/writer, in step S24, the antenna 21, the electrical power regeneration circuit 22, the clock extraction circuit 23, the reception circuit 24, the transmission circuit 25, the controller 26, the output circuit 27, the non-volatile memory 28, or the input circuit 29 performs card mode processing with the reader/writer (not shown) that has transmitted the card detection signal.

More specifically, in the passive IC card reader/writer 11, the magnetic field radiated from the reader/writer serves to supply electrical power, the internal circuit of the passive IC card reader/writer 11 is started up, and the communication channel between the passive IC card reader/writer 11 and the card reader/writer is opened. As a result, the reader/writer (not shown) reads and writes information from and into the passive IC card reader/writer 11 operating in the card mode.

In step S25, the controller 26 determines whether or not the card mode process has been completed.

When it is determined in step S25 that the card mode process has not been completed, the process returns to step S24, and the above-described processing is repeated.

That is, processing of steps S24 and S25 is repeated until the card mode process with the reader/writer (not shown) is completed and it is determined in step S25 that the card mode process is completed.

Thereafter, when it is determined in step S25 that the card mode process is completed, the process proceeds to step S36.

On the other hand, when it is determined in step S23 that the card detection signal has not been received from the reader/writer (not shown), in step S26, the controller 26 determines whether or not a predetermined period of time necessary for shifting from the card mode to the reader/writer mode has passed.

When it is determined in step S26 that the predetermined period of time has not passed, the process returns to step S23, and the above-described processing is repeated. That is, processing of steps S23 and S26 is repeated until a predetermined period of time necessary for shifting from the card mode to the reader/writer mode has passed and it is determined in step S26 that the predetermined period of time has passed.

In step S27, the mode controller 26a shifts the operation mode of the passive IC card reader/writer 11 from the card mode to the reader/writer mode. As a result, since the passive IC card reader/writer 11 is placed in the reader/writer mode, it operates as a reader/writer.

That is, the passive IC card reader/writer 11 starts up by using the magnetic field generated by the magnetic-field generator 12 as a power supply, and thereafter monitors whether an external card detection signal is transmitted for a fixed amount of time. When the card detection signal is not transmitted, the passive IC card reader/writer 11 operates in the reader/writer mode.

In step S28, under the control of the controller 26, the transmission circuit 25 transmits a card detection signal via the antenna 21. More specifically, on the basis of the information stored in the non-volatile memory 28, the controller 26 generates a card detection signal and supplies it to the transmission circuit 25. Then, the transmission circuit 25 performs a predetermined modulation process on the card detection signal from the controller 26, supplies a modulated wave obtained thereby to the antenna 21, thereby transmitting the card detection signal.

In step S29, the controller 26 monitors the status of the reception circuit 24 in order to determine whether or not the antenna 21 has received the card detection response from the non-contact IC card 13.

When it is determined in step S29 that the card detection response has not been received from the non-contact IC card 13, the process returns to step S29, and the above-described processing is repeated. That is, the processing of step S29 is repeated until a card detection response is transmitted from the non-contact IC card 13 and it is determined in step S29 that the card detection response has been received from the non-contact IC card 13. In other words, it may be said that, at this time, the passive IC card reader/writer 11 is performing polling.

At this point, when the user moves the non-contact IC card 13 close to the passive IC card reader/writer 11 (the magnetic-field generator 12), in step S51, the magnetic field radiated from the antenna 41 of the magnetic-field generator 12 causes electrical power to be supplied to the non-contact IC card 13, and the non-contact IC card 13 is placed in a power-on state. For example, in the door lock mechanism 61 provided in a door, when the user moves the non-contact IC card 13 close to (the door lock mechanism 61 provided in) the door, electrical power is supplied to the non-contact IC card 13 by means of the magnetic field generated by the magnetic-field generator 12, and the non-contact IC card 13 is driven.

As a result, in the non-contact IC card 13, the internal circuit thereof starts up, and the communication channel between the non-contact IC card 13 and the passive IC card reader/writer 11 is opened. Therefore, it becomes possible for the passive IC card reader/writer 11 to read and write information from and into the non-contact IC card 13.

In step S52, the non-contact IC card 13 determines whether or not a card detection signal has been received from the passive IC card reader/writer 11.

When it is determined in step S52 that the card detection signal has not been received from the passive IC card reader/writer 11, the process returns to step S52, and the above-described processing is repeated. That is, the processing of step S52 is repeated until a card detection signal is transmitted from the passive IC card reader/writer 11 and it is determined in step S52 that the card detection signal has been received from the passive IC card reader/writer 11.

On the other hand, when it is determined in step S52 that the card detection signal has been received from the passive IC card reader/writer 11, in step S53, the non-contact IC card 13 transmits a card detection response to the passive IC card reader/writer 11.

At this time, in the passive IC card reader/writer 11, since it is determined in step S29 that the card detection response has been received from the non-contact IC card 13, the process proceeds to step S30.

In step S30, the controller 26 monitors the status of the reception circuit 24 in order to determine whether or not the antenna 21 has received a service response from the non-contact IC card 13.

At this point, the term "service response" refers to a response indicating various kinds of services that are assigned to the non-contact IC card 13. For example, in the IC card system 1 of FIG. 2, since the non-contact IC card 13 is used as a key of a door, "door key service" is assigned to the non-contact IC card 13.

When it is determined in step S30 that the service response has not been received from the non-contact IC card 13, the process returns to step S30, and the above-described processing is repeated. That is, the processing of step S30 is repeated until the service response is transmitted from the non-contact IC card 13 and it is determined in step S30 that the service response has been received from the non-contact IC card 13.

At this time, after the non-contact IC card 13 transmits a card detection response to the passive IC card reader/writer 11 in step S53, the non-contact IC card 13 transmits a service response to the passive IC card reader/writer 11 in step S54. The process then proceeds to step S55.

Then, in the passive IC card reader/writer 11, since it is determined in step S30 that the service response has been received from the non-contact IC card 13, the process proceeds to step S31.

In step S31, the controller 26 determines whether or not the service set in the passive IC card reader/writer 11 has been set in the non-contact IC card 13. More specifically, for example, in the passive IC card reader/writer 11 of the door lock mechanism 61 provided in the door, the controller 26 determines whether or not a service response indicating, for example, "door key service", which is a service response transmitted from the non-contact IC card 13 presented by the user and which is supplied from the reception circuit 24, matches information on service, which is stored in the non-volatile memory 28.

In the passive IC card reader/writer 11, the input circuit 29 supplies a signal regarding a service to the controller 26, and on the basis of the signal, the controller 26 selects which service should be performed. As a result, it is possible for the passive IC card reader/writer 11 to allow another device (for example, the lock releasing mechanism 73 of FIG. 2) connected thereto to perform various kinds of services.

When it is determined in step S31 that the service set in the passive IC card reader/writer 11 has been set in the non-contact IC card 13, the process returns to step S32. In steps S32 and S55, the passive IC card reader/writer 11 and the non-contact IC card 13 perform a mutual authentication process.

More specifically, in step S32, the authentication section 26b performs, with the non-contact IC card 13, mutual authentication for the authentication section 26b to access information stored in the non-contact IC card 13. In step S55, the non-contact IC card 13 performs, with the passive IC card reader/writer 11, mutual authentication for the passive IC card reader/writer 11 to access the information stored in the non-contact IC card 13. That is, the processing of steps S32 and S55 (mutual authentication process) is mutual authentication for the passive IC card reader/writer 11 to access the information stored in the non-contact IC card 13.

For example, in the mutual authentication process, the passive IC card reader/writer 11 generates a predetermined random number, such as a binomial random number, a Poisson random number, or a normal random number, and notifies the non-contact IC card 13 of the random number and a request indicating information desired to be read. On the other hand, the non-contact IC card 13 reads a key corresponding to the notified request, encrypts the notified random number using the key, and notifies the passive IC card reader/writer 11 of the encrypted random number. The passive IC card reader/writer 11 decrypts the encrypted random number by using an authentication key and authenticates that the non-contact IC card 13 is an authorized device if the random number notified by the non-contact IC card 13 matches the decrypted random number.

Similarly, for example, the non-contact IC card 13 generates a predetermined random number and notifies it to the passive IC card reader/writer 11. The passive IC card reader/writer 11 encrypts the random number by using an encryption key and notifies the non-contact IC card 13 of the encrypted random number. The non-contact IC card 13 decrypts the encrypted random number by using a decryption key and authenticates that the passive IC card reader/writer 11 is an authorized device if the decrypted random number matches the random number notified to the passive IC card reader/writer 11.

In step S33, on the basis of the result of the mutual authentication process, the authentication section 26b determines whether or not the non-contact IC card 13 is an authorized non-contact IC card.

When it is determined in step S33 that the non-contact IC card 13 is an authorized non-contact IC card, in step S34, the controller 26 turns on the output circuit 27 so that data from the controller 26 can be output to another device (not shown) via the output circuit 27.

In step S35, the output circuit 27 outputs the data from the controller 26. More specifically, for example, in the passive IC card reader/writer 11 of the door lock mechanism 61 provided in the door, when it is verified that the non-contact IC card 13 is an authorized non-contact IC card, the controller 26 short-circuits the output terminal (for example, the terminal 8 of FIG. 4) of the output circuit 27, thereby notifying, via the output circuit 27, the lock releasing mechanism 73 of the fact that the lock of the door is to be released. Thereafter, for example, on the basis of the notification from the output circuit 27, the lock releasing mechanism 73 releases the key of the door in which the door lock mechanism 61 is provided. As a result, it is possible for the user having the authorized non-contact IC card 13 to open the door and enter the room.

On the other hand, when it is determined in step S31 that the service set in the passive IC card reader/writer 11 has not been set in the non-contact IC card 13, for example, in the door lock mechanism 61 provided in the door, when the non-contact IC card 13 to which the service of "door key service" is not assigned is presented, the process for releasing the key of the door is not performed. Therefore, the processing of steps S32 to S35 is skipped.

When it is determined in step S33 that the non-contact IC card 13 is not an authorized non-contact IC card, for example, in the door lock mechanism 61 provided in the door, when the unauthorized non-contact IC card 13 is presented, the process for releasing the key of the door is not performed. Therefore, the processing of steps S34 and S35 is skipped.

In step S12, the magnetic-field generator 12 turns off the power supply, and the processing of the magnetic-field generator 12 is completed. More specifically, for example, in the door lock mechanism 61 provided in the door, the switch 45 of the magnetic-field generator 12 is turned off, and the electrical power generated by the power generator 72 is not supplied to the magnetic-field generation circuit 42 of the magnetic-field generator 12. As a result, the magnetic-field generator 12 stops the generation of the magnetic field.

In the following, the processing of step S36 by the passive IC card reader/writer 11 and the processing of step S56 by the non-contact IC card 13 are processing when a magnetic field by the magnetic-field generator 12 is not generated.

In step S36, since a magnetic field by the magnetic-field generator 12 is not generated, it is not possible for the electrical power regeneration circuit 22 to obtain electrical power from the magnetic field. Therefore, the electrical power regeneration circuit 22 stops the supply of the power-supply voltage $V_{CC}$ to each section of the passive IC card reader/writer 11, and turns off the power supply of the passive IC card reader/writer 11. Thus, the processing of the passive IC card reader/writer 11 is completed. For example, when the service of the passive IC card reader/writer 11 is "door key service", the passive IC card reader/writer 11 maintains the key of the door kept opened until there is no magnetic field from the magnetic-field generator 12.

In step S56, similarly to the passive IC card reader/writer 11, since the magnetic field by the magnetic-field generator 12 is not generated, it is not possible for the non-contact IC card 13 to obtain electrical power from the magnetic field. Therefore, the power supply is turned off, and the processing of the non-contact IC card 13 is completed.

In the manner described above, the passive IC card reader/writer 11 and the non-contact IC card 13 perform data transmission/reception via the magnetic field generated by the magnetic-field generator 12.

As described above, since the passive IC card reader/writer 11 is driven by the electrical power obtained from the magnetic field generated by the magnetic-field generator 12, it is not necessary to incorporate therein an output circuit for supplying electrical power to the non-contact IC card 13 or an oscillator for generating a clock. Therefore, the size of the passive IC card reader/writer 11 can be reduced. Furthermore, since the passive IC card reader/writer 11 does not need to incorporate an expensive crystal oscillator 43, it is possible to provide the passive IC card reader/writer 11 at a low cost.

In the IC card system 1, the configuration of the passive IC card reader/writer 11 is simplified by disconnecting the magnetic-field generator 12 from the passive IC card reader/writer 11. The passive IC card reader/writer 11 can be configured by providing, for example, a terminal for output in a basic circuit incorporated in the non-contact IC card 13. As a result, since a non-contact IC card in common use can also be used for the passive IC card reader/writer 11, the cost of the passive IC card reader/writer 11 can be decreased.

Furthermore, in the IC card system 1, when operating in the reader/writer mode, with the passive IC card reader/writer 11 and the magnetic-field generator 12 being integrated, electrical power that is consumed by constantly generating a magnetic field or by performing polling for detecting the non-contact IC card 13 is used. As a result, the magnetic-field generator 12 is turned on only when the non-contact IC card 13 is used, so that electrical power is supplied to the passive IC card reader/writer 11. As a result, since the passive IC card reader/writer 11 starts polling when the non-contact IC card 13 approaches it, power consumption can be suppressed.

Figure 5:
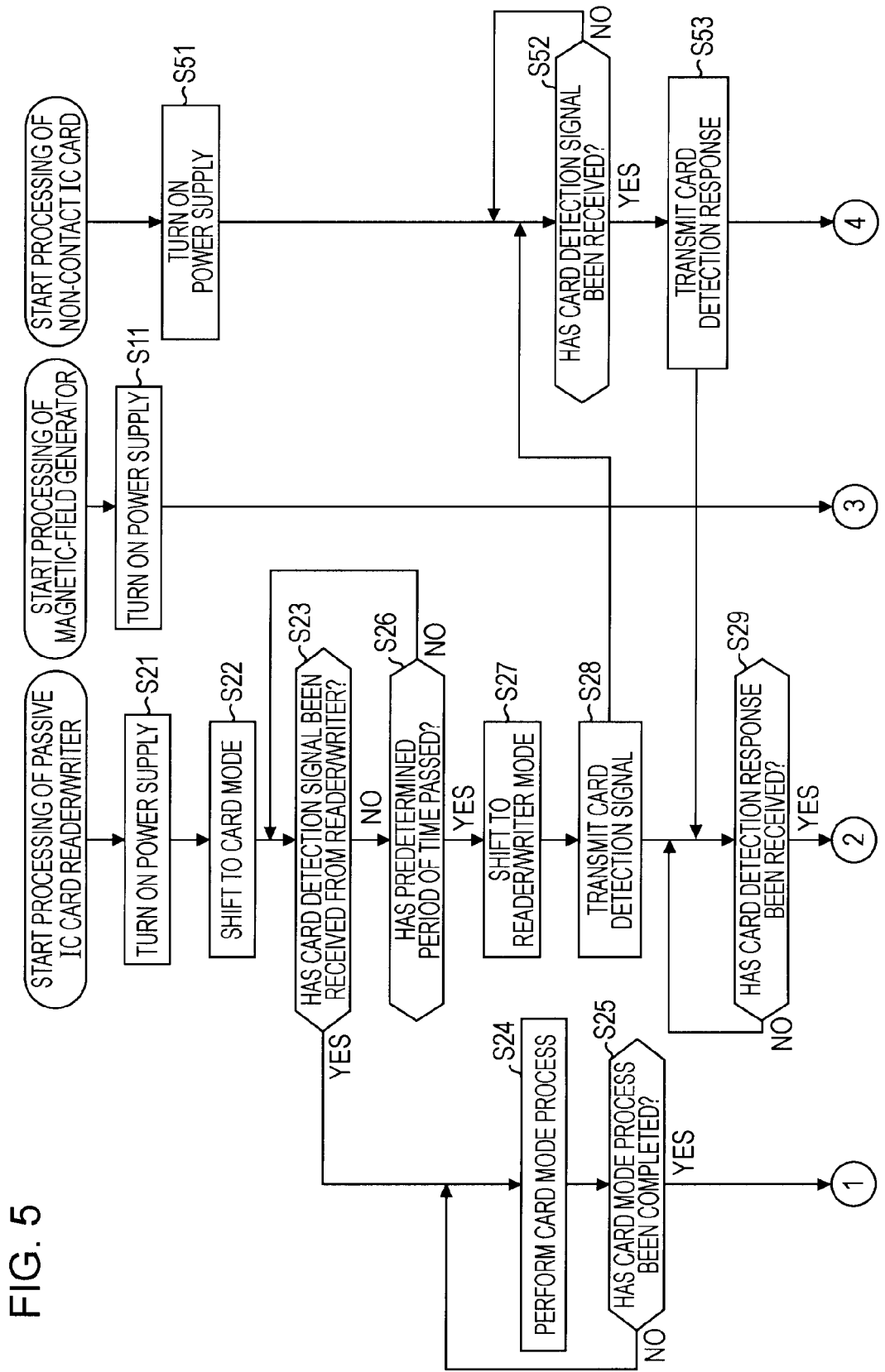
FIG. 5 is a flowchart illustrating the processing of data transmission/reception performed by an IC card system.
Figure 6:
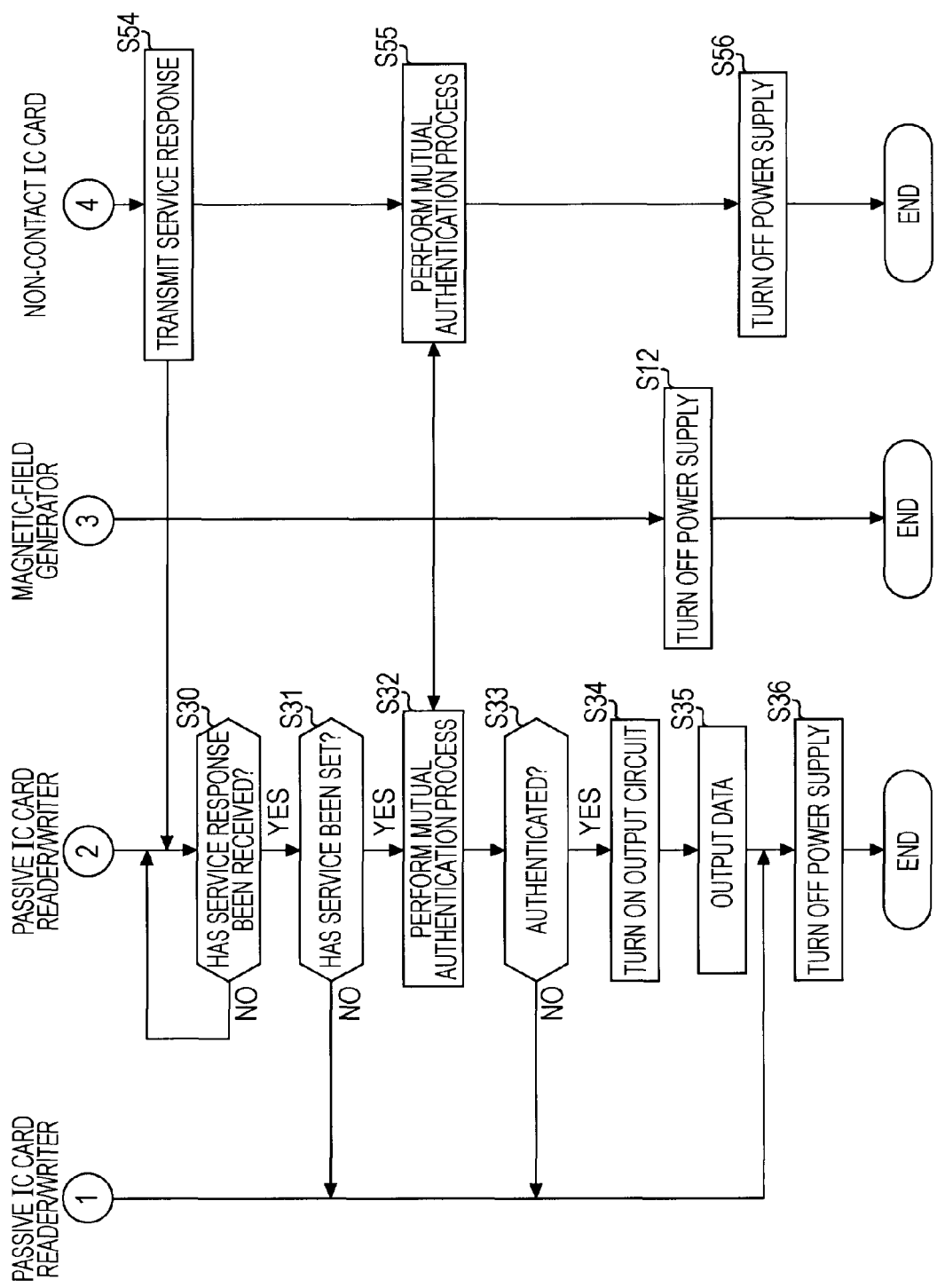
FIG. 6 is a flowchart illustrating the processing of data transmission/reception performed by the IC card system.

In the processing of steps S22 and S27 of FIG. 5 described above, the outline of the shifting of the operation mode in the passive IC card reader/writer 11 has been described. Next, a description will be given in more detail, with reference to FIGS. 7 and 8, of the operation mode of the passive IC card reader/writer 11.

Figure 7:
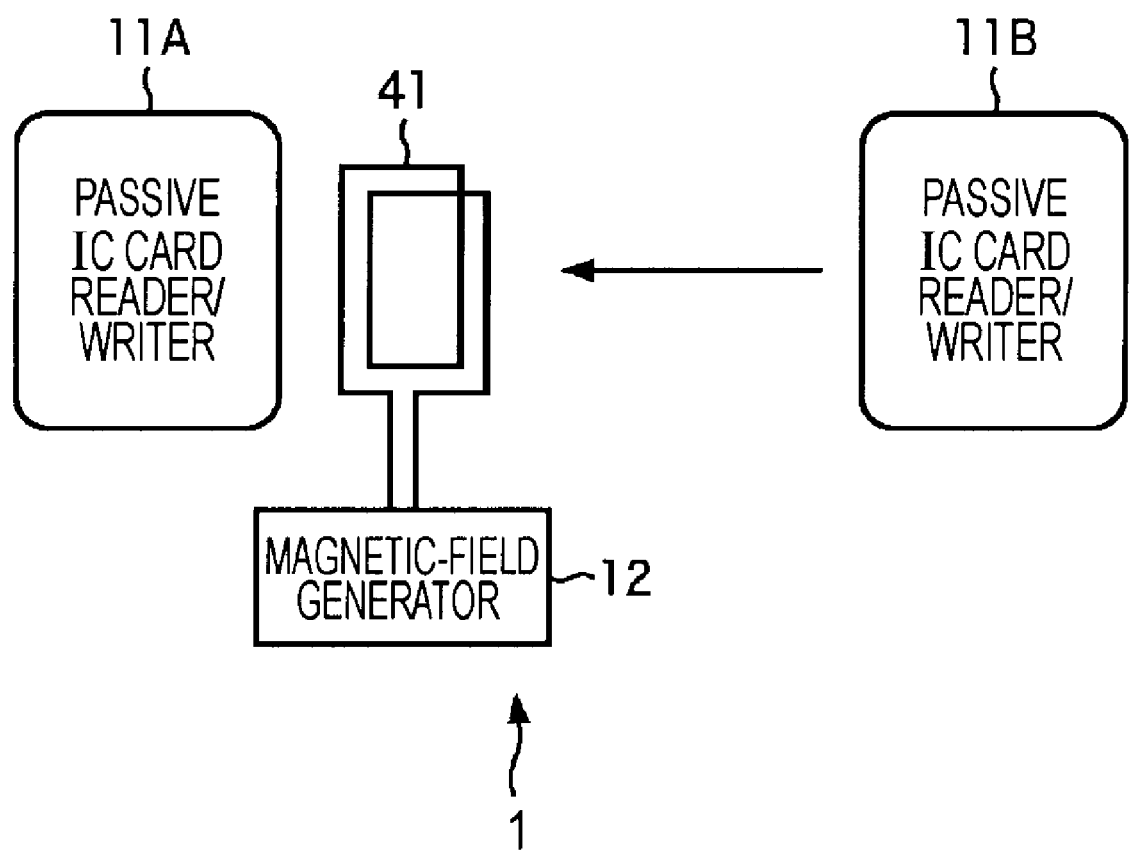
FIG. 7 is a block diagram illustrating the details of the operation mode of a passive IC card reader/writer.

FIG. 7 is a block diagram illustrating the details of the operation mode of the passive IC card reader/writer 11.

In the example of FIG. 7, the IC card system 1 includes a passive IC card reader/writer 11A, a passive IC card reader/writer 11B, and the magnetic-field generator 12.

Components in FIG. 7, which correspond to those in FIG. 1, are designated with the same reference numerals, and descriptions of components for which the same processing is performed are omitted to avoid duplicate description. The passive IC card reader/writer 11A and the passive IC card reader/writer 11B are configured similarly to the passive IC card reader/writer 11 of FIG. 1.

In FIG. 7, the switch 45 of the magnetic-field generator 12 is turned off, and when a magnetic field is not generated in the antenna 41, it is difficult for the passive IC card reader/writer 11A to obtain electrical power from the magnetic field. Therefore, the passive IC card reader/writer 11A is in a power-off state. At this time, since the passive IC card reader/writer 11B is positioned away from the magnetic-field generator 12, the passive IC card reader/writer 11B is in a power-off state similarly to the passive IC card reader/writer 11A.

Figure 8:
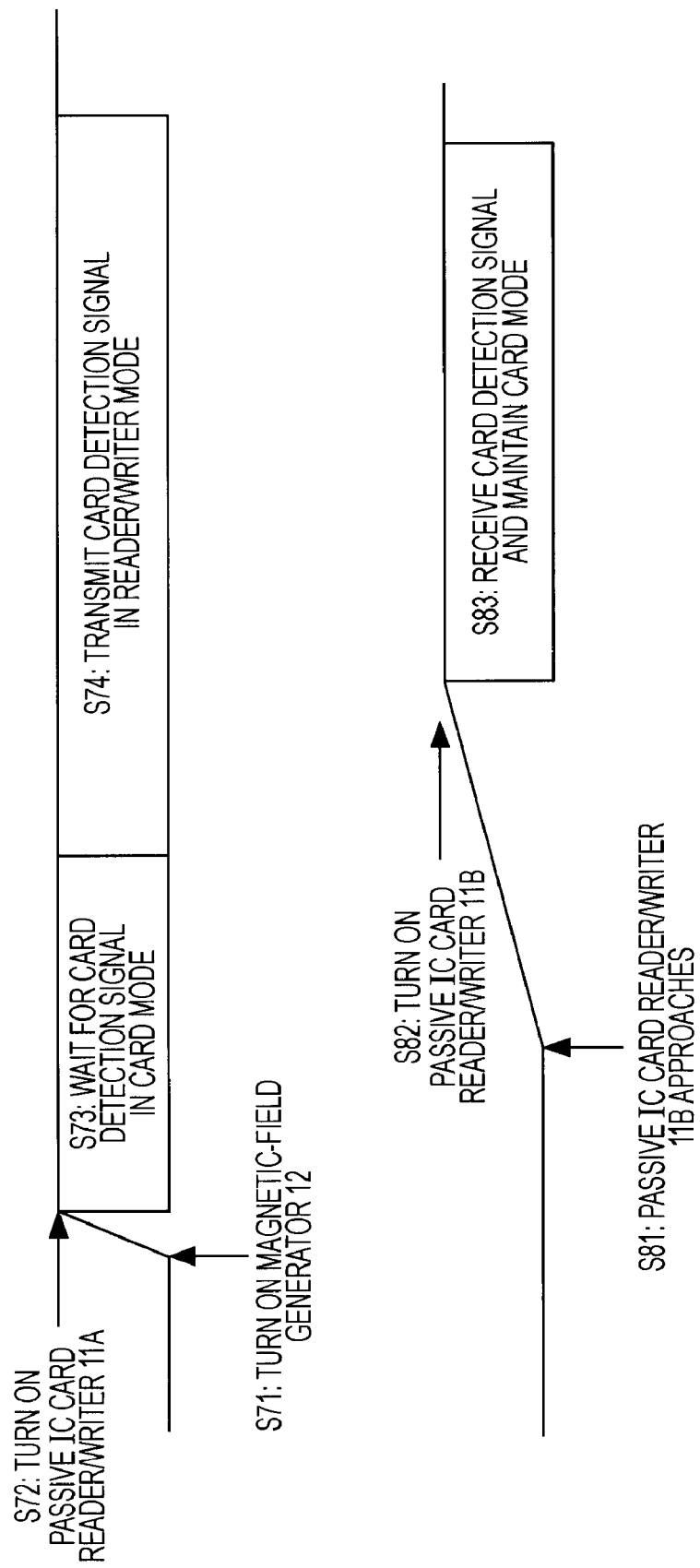
FIG. 8 is a sequence diagram illustrating the details of the operation mode of the passive IC card reader/writer.

At this point, as shown in the sequence diagram of FIG. 8, in step S71, the switch 45 of the magnetic-field generator 12 is turned on, and a magnetic field is generated in the antenna 41. Then, in step S72, the passive IC card reader/writer 11A is driven by the electrical power obtained from the magnetic field, and the passive IC card reader/writer 11A is placed in a power-on state.

In the sequence diagram of FIG. 8, the operations in the upper side of the figure indicate operations related to the passive IC card reader/writer 11A. The operations in the lower side of the figure indicate operations related to the passive IC card reader/writer 11B.

In step S73, the passive IC card reader/writer 11A operates in the card mode and waits for a card detection signal to be transmitted from the reader/writer (not shown). That is, the passive IC card reader/writer 11A waits for a predetermined period of time necessary for the mode to shift from the card mode to the reader/writer mode to pass.

For example, when the passive IC card reader/writer 11B approaches the magnetic-field generator 12 as a result of, for example, the user moving the passive IC card reader/writer 11B close to the magnetic-field generator 12 in step S81, the passive IC card reader/writer 11B is driven by electrical power obtained from the magnetic field by the magnetic-field generator 12, and the passive IC card reader/writer 11B is placed in a power-on state.

When a card detection signal is not transmitted for a fixed amount of time, the passive IC card reader/writer 11A operating in the card mode shifts from the card mode to the reader/writer mode in step S74. Then, the passive IC card reader/writer 11A that is placed in the reader/writer mode transmits a card detection signal.

In step S83, the passive IC card reader/writer 11B operating in the card mode receives the card detection signal from the passive IC card reader/writer 11A, and the card mode is maintained.

As a result, in the IC card system 1 of FIG. 7, the passive IC card reader/writer 11A operates in the reader/writer mode, and the passive IC card reader/writer 11B operates in the card mode. That is, since the passive IC card reader/writer 11A and the passive IC card reader/writer 11B is communicable with each other, it becomes possible for the passive IC card reader/writer 11A operating in the reader/writer mode to read and write information from and into the passive IC card reader/writer 11B.

Thereafter, as described above, the passive IC card reader/writer 11A performs the processing of step S29 and subsequent steps of FIG. 5, and the passive IC card reader/writer 11B performs the processing of step S53 and subsequent steps of FIG. 5.

As described above, when the passive IC card reader/writer 11A is placed in a power-on state, it shifts to a reader/writer mode, and thereby detects a card detection signal from another reader/writer (not shown) for a fixed amount of time before performing polling for detecting the passive IC card reader/writer 11B. Then, it is possible for the passive IC card reader/writer 11A to shift to a card mode and operate as a non-contact IC card when another reader/writer transmits a card detection signal. That is, it is possible for the passive IC card reader/writer 11A to operate in both the reader/writer mode and the card mode.

At this point, a case in which, for example, important information is moved by using the passive IC card reader/writer 11 will be considered. The magnetic-field generator 12 turns on the power supply and generates a magnetic field, thereby supplying electrical power obtained from the magnetic field to the passive IC card reader/writer 11A in order to drive it. At this time, the passive IC card reader/writer 11A operates in the reader/writer mode and performs polling. As a result, when the passive IC card reader/writer 11B having important information approaches the passive IC card reader/writer 11A, the passive IC card reader/writer 11A detects the passive IC card reader/writer 11B. The passive IC card reader/writer 11B is driven by electrical power obtained from the magnetic field from the magnetic-field generator 12 and operates in the card mode. As a result, the passive IC card reader/writer 11A operating in the reader/writer mode obtains the important information from the passive IC card reader/writer 11B operating in the card mode.

Then, as a result of the generation of the magnetic field by the magnetic-field generator 12 being stopped, the supply of electrical power obtained from the magnetic field is stopped, and the passive IC card reader/writer 11A is placed in a power-off state. Thereafter, the passive IC card reader/writer 11A starts up again in response to a polling from the reader/writer (not shown). At this time, the passive IC card reader/writer 11A operates in the card mode and transmits important information obtained from the passive IC card reader/writer 11B, the information being held by the passive IC card reader/writer 11A, to the reader/writer. As a result, the important information is obtained by the reader/writer (not shown) from the passive IC card reader/writer 11B via the passive IC card reader/writer 11A.

As described above, by changing the operation mode, it is possible for the passive IC card reader/writer 11 to easily move important information.

Although it has been described in this embodiment that the passive IC card reader/writer 11 operates in both the reader/writer mode and the card mode, the passive IC card reader/writer 11 may operate in one of the reader/writer mode and the card mode.

The series of the above-described processes can be performed by hardware and can also be performed by software. When the series of processes is to be performed by software, a program forming the software is installed from a program recording medium into a computer incorporated into dedicated hardware or is installed into, for example, a general-purpose personal computer capable of executing various functions by installing various programs.

FIG. 9 is a block diagram showing an example of the configuration of a personal computer for executing the above-described series of processes in accordance with a program. A CPU (Central Processing Unit) 111 executes various kinds of processing in accordance with programs recorded in a ROM (Read Only Memory) 112 or a recorder 118. In a RAM (Random Access Memory) 113, programs executed by the CPU 111, data, and the like are stored as appropriate. The CPU 111, the ROM 112, and the RAM 113 are interconnected with one another via a bus 114.

An input/output interface 115 is further connected to the CPU 111 via the bus 114. An input section 116 including a microphone and the like, and an output section 117 including a display, a speaker, and the like are connected to the input/output interface 115. The CPU 111 executes various kinds of processing in accordance with instructions input from the input section 116. Then, the CPU 111 outputs the processing result to the output section 117.

The recorder 118 connected to the input/output interface 115 is constituted by, for example, a hard disk, and records programs executed by the CPU 111 and various kinds of data. A communication section 119 performs communication with external devices via a network, such as the Internet or a local area network.

Programs may be obtained via the communication section 119 and may be recorded in the recorder 118.

When a removable medium 121, such as a magnetic disk, an optical disc, a magneto-optical disc, or a semiconductor memory, when it is loaded into a drive 120 connected to the input/output interface 115, the drive 120 drives the removable medium and obtains programs, data, and the like recorded therein. The obtained programs and data are transferred to the recorder 118 and are recorded therein as necessary.

As shown in FIG. 9, a program recording medium having stored thereon a program that is installed into a computer and placed in a computer-executable state is formed of a removable medium, which is a packaged medium, such as a magnetic disk (including a flexible disk), an optical disc (including a CD-ROM (Compact Disc-Read Only Memory), a DVD (Digital Versatile Disc)), a magneto-optical disc, or a semiconductor memory, the ROM 112, a hard disk constituting the recorder 118, or the like, in which a program is temporarily or permanently stored. The storage of a program onto the program recording medium is performed as necessary by using a wired or wireless communication medium, such as a local area network, the Internet, or a digital satellite broadcast, via the communication section 119, which is an interface such as a router, a modem, and the like.

In this specification, the steps describing a program stored on a recording medium include not only processes carried out in time series in the described order but also processes carried out in parallel or individually and not necessarily in time series.

In this specification, the system designates the overall apparatus formed of a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising:
 a magnetic-field generation apparatus configured to generate a magnetic field having a magnetic-flux density changing with time; and
 an information processing apparatus for performing wireless communication with an electronic device, the information processing apparatus having a reader/writer function and an IC card function, the information processing apparatus configured to perform the IC card function upon detection of a card detection signal transmitted from a reader/writer apparatus; and
 the information processing apparatus including:
  an antenna configured to cause an induced voltage to be generated from the magnetic field upon operation of the reader/writer function
  the antenna configured to cause an induced voltage to be generated from a magnetic field from the reader/writer apparatus upon operation of the IC card function;
  supply means for supplying electrical power to each section of the information processing apparatus, the electrical power obtained by rectifying the generated induced voltage;
  verification means for verifying whether the electronic device in a communicable state is an authorized device on the basis of the magnetic field generated by the magnetic-field generation apparatus upon operation of the reader/writer function; and
  output means for outputting, to another device, output information for allowing the another device connected to the information processing apparatus to operate, the output information being obtained from transmission information transmitted from the electronic device upon verification of the electronic device as the authorized device.

2. An information processing apparatus for performing wireless communication with an electronic device, the information processing apparatus comprising:
 controller means for performing a reader/writer function and an IC card function, the controller means performing the IC card function upon detection of a card detection signal transmitted from a reader/writer apparatus;
 an antenna configured to cause, upon operation of the reader/writer function, an induced voltage to be generated from a magnetic field generated by a magnetic-field generation apparatus, the magnetic flux of the magnetic field changing with time,
 the antenna configured to cause, upon operation of the IC card function, an induced voltage to be generated from a magnetic field from the reader/writer apparatus;
 supply means for supplying electrical power to each section of the information processing apparatus, the electrical power obtained by rectifying the generated induced voltage;
 verification means for verifying whether the electronic device in a communicable state is an authorized device on the basis of the magnetic field generated by the magnetic-field generation apparatus upon operation of the reader/writer function; and output means for outputting, to another device, output information for allowing the another device connected to the information processing apparatus to operate, the output information being obtained from transmission information transmitted from the electronic device upon verification of the electronic device as the authorized device.

3. The information processing apparatus according to claim 2, wherein the control means controls an operation mode so that, when the IC card function is operated, the reader/writer function is operated when the time period during which the IC card function is operated has passed a predetermined time period.

4. The information processing apparatus according to claim 2, further comprising:
 extraction means for extracting, from the magnetic field, a clock used for the operation of each section of the information processing apparatus.

5. The information processing apparatus according to claim 2, wherein the output means outputs the output information to the another device when the transmission information matches information regarding a service provided by the other device, the information being stored in the information processing apparatus.

6. An information processing method for use with an information processing apparatus for performing wireless communication with an electronic device, the information processing apparatus having a reader/writer function and an IC card function, the information processing method comprising:
 switching from the IC card function to the reader/writer function upon determination that a card detection signal associated with a reader/writer apparatus has not been received after a predetermined time period;
 causing, upon operation of the reader/writer function, an antenna to supply electrical power to each section of the information processing apparatus, the electrical power being obtained by rectifying an induced voltage generated from a magnetic field generated by a magnetic-field generation apparatus, the magnetic-flux density of the magnetic field changing with time;
 causing, upon operation of the IC card function, the antenna to supply electrical power to each section of the information processing apparatus, the electrical power being obtained by rectifying an induced voltage generated from a magnetic field from the reader/writer function;
 verifying whether the electronic device in a communicable state is an authorized device by using the magnetic field generated by the magnetic-field generation apparatus upon operation of the reader/writer function; and
 outputting, to another device, output information for allowing the another device connected to the information processing apparatus to operate, the output information being obtained from transmission information transmitted from the electronic device upon verification of the electronic device as the authorized device.

7. The information processing method according to claim 6, further comprising:
 controlling an operation mode so that, when the IC card function is operated, the reader/writer function is operated when the time period during which the IC card function is operated has passed a predetermined time period.

8. The information processing method according to claim 6, further comprising:
 extracting, from the magnetic field, a clock used for the operation of each section of the information processing apparatus.

9. The information processing method according to claim 6, further comprising:
 outputting the output information to the another device when the transmission information matches information regarding a service provided by the another device, the information being stored in the information processing apparatus.

10. An information processing system comprising:
 a magnetic-field generation apparatus configured to generate a magnetic field having a magnetic-flux density changing with time; and
 an information processing apparatus configured to perform wireless communication with an electronic device, the information processing apparatus having a reader/writer function and an IC card function, the information processing apparatus configured to switch from the IC card function to the reader/writer function upon determination that a card detection signal associated with a reader/writer apparatus has not been received after a predetermined time period; and
 the information processing apparatus including:
  an antenna configured to cause an induced voltage to be generated from the magnetic field upon operation of the reader/writer function
  the antenna configured to cause an induced voltage to be generated from a magnetic field from a reader/writer apparatus upon operation of the IC card function;
  a supply section configured to supply electrical power obtained by rectifying the generated induced voltage to each section of the information processing apparatus;
  a verification section configured to verify whether the electronic device in a communicable state is an authorized device on the basis of the magnetic field generated by the magnetic-field generation apparatus upon operation of the reader/writer function; and
  an output section configured to output, to another device, output information for allowing the another device connected to the information processing apparatus to operate, the output information being obtained from transmission information transmitted from the electronic device upon verification of the electronic device as the authorized device.

11. An information processing apparatus for performing wireless communication with an electronic device, the information processing apparatus comprising:
 a controller configured to perform a reader/writer function and an IC card function, the controller configured to switch from the IC card function to the reader/writer function upon determination that a card detection signal associated with a reader/writer apparatus has not been received after a predetermined time period;
 an antenna configured to cause, upon execution of the reader/writer function, an induced voltage to be generated from a magnetic field generated by a magnetic-field generation apparatus, the magnetic flux of the magnetic field changing with time,
 the antenna configured to cause, upon operation of the IC card function, an induced voltage to be generated from a magnetic field from the reader/writer apparatus;
 a supply section configured to supply electrical power to each section of the information processing apparatus, the electrical power obtained by rectifying the generated induced voltage;

a verification section configured to verify whether the electronic device in a communicable state is an authorized device on the basis of the magnetic field generated by the magnetic-field generation apparatus upon operation of the reader/writer function; and an output section configured to output, to another device, output information for allowing the another device connected to the information processing apparatus to operate, the output information being obtained from transmission information transmitted from the electronic device upon verification of the electronic device as the authorized device.

12. The information processing apparatus according to claim 11, wherein the controller is further configured to control an operation mode so that, when the IC card function is operated, the reader/writer function is operated when the time period during which the IC card function is operated has passed a predetermined time period.

13. The information processing apparatus according to claim 11, further comprising:

an extraction section configured to extract, from the magnetic field, a clock used for the operation of each section of the information processing apparatus.

14. The information processing apparatus according to claim 11, wherein the output section is further configured to output the output information to the another device when the transmission information matches information regarding a service provided by the another device, the information being stored in the information processing apparatus.

15. An information processing apparatus for performing wireless communication with an electronic device, the information processing apparatus having a reader/writer function and an IC card function, the information processing apparatus comprising:

an antenna for causing an induced voltage to be generated from a magnetic field generated by a magnetic-field generation apparatus, the magnetic flux of the magnetic field changing with time, when the reader/writer function is to be operated and for causing an induced voltage to be generated from a magnetic field from a reader/writer when the IC card function is to be operated;

supply means for supplying electrical power obtained by rectifying the generated induced voltage to each section of the information processing apparatus;

verification means for verifying whether or not the electronic device in a communicable state is an authorized device on the basis of the magnetic field generated by the magnetic-field generation apparatus when the reader/writer function is to be operated;

output means for outputting, to another device, output information for allowing the another device connected to the information processing apparatus to operate, the output information being obtained from transmission information transmitted from the electronic device, when the electronic device is authenticated to be an authorized device; and control means for controlling an operation mode so that, when the IC card function is operated, the reader/writer function is operated when the time period during which the IC card function is operated has passed a predetermined time period.

16. An information processing apparatus for performing wireless communication with an electronic device, the information processing apparatus comprising:

controller means for performing a reader/writer function and an IC card function, the controller means performing the IC card function upon detection of a card detection signal transmitted from a reader/writer apparatus;

an antenna configured to cause, upon operation of the reader/writer function, an induced voltage to be generated from a magnetic field generated by a magnetic-field generation apparatus, the antenna configured to cause, upon operation of the IC card function, an induced voltage to be generated from a magnetic field from the reader/writer apparatus;

supply means for supplying electrical power to each section of the information processing apparatus, the electrical power obtained by rectifying the generated induced voltage;

verification means for verifying whether the electronic device in a communicable state is an authorized device on the basis of the magnetic field generated by the magnetic-field generation apparatus upon operation of the reader/writer function; and output means for outputting, to another device, output information for allowing the another device connected to the information processing apparatus to operate, the output information being obtained from transmission information transmitted from the electronic device upon verification of the electronic device as the authorized device.

* * * * *